United States Patent Office 3,449,319
Patented June 10, 1969

3,449,319
WATER SOLUBLE POLYMERIC SURFACTANT
AZO FUGITIVE TINTS
Hans H. Kuhn, Spartanburg, S.C., assignor to Deering
 Milliken Research Corporation, Spartanburg, S.C., a
 corporation of Delaware
No Drawing. Filed Sept. 1, 1965, Ser. No. 484,464
Int. Cl. C09b *29/00;* C08g *51/66;* D06p *1/10*
U.S. Cl. 260—207.5                                    10 Claims

ABSTRACT OF THE DISCLOSURE

As a water-soluble fugitive tint, the molecular complex resultant from associating in an aqueous solution as anionic polymer characterized by the formula $$R\text{—}[\text{—}(CH_2CH_2O)_nH]_x$$

wherein R is an organic dyestuff radical, n is at least 15, x is from 1 to 6 and the product of n times x is at least 30, with a water soluble organic polymeric acid compound capable of forming a molecular association with the ether groups of said anionic polymer. The tint has a pH of not less than 6 and the polymeric acid compound comprises from about 10% by weight to about 60% by weight of the tint on a dry basis. These fugitive tints have improved crock resistance, undiminished fugitivity and improved fugitivity from cotton fibers.

This invention relates to fugitive tinting of textile materials and more specifically to fugitive tinting of textile materials with noncrocking tints.

The fugitive tinting of textile materials to assist in fiber yarn, thread or fabric identification during weaving or knitting operations or prior thereto is a well-known and universally practiced art. Commonly employed are dyestuffs having marginal affinity to certain fibers usually compounded with materials to further reduce their dyeing ability. A recent advance in the field of fugitive tinting is the use of a water-soluble polymeric surfactant having at least 30 repeating units in the molecule, a molecular weight of at least 1000 and having a dyestuff molecule attached to the polymeric chain. Fugitive tints of this type have been employed for marking Dacron, Orlon, wool, cellulose acetate and the like. While fugitive tints of the surfactant type are a superior type of fugitive tint, fugitive tints of the surfactant type are subject to a defect known as crocking, and also exhibit an undesirably strong affinity for cotton fibers. A crocking defect is a deficiency wherein excess coloring matter rubs from the treated material. Dyestuffs are commonly tested for their resistance to crocking by AATCC standard test method 8–1961. The crocking problem present in the use of fugitive tints is compounded by the fact that penetration of the fibrous material by the fugitive tint is undesirable in that the tint must be subsequenly removed and therefore the tint should be present on the surface of the fiber alone. The crocking problem in fugitive tints is also serious in that a transfer of the identification marking tint from one textile material to another can result in serious fiber identification problems.

It is therefore an object of this invention to provide a fugitive tint of the water-soluble polymeric surfactant type having improved crock resistance.

It is another object of this invention to provide fugitive tints of the water-soluble polymeric surfactant type having improved crock resistance and undiminished fugitivity.

It is still another object of this invention to provide fugitive tints of the water-soluble polymeric surfactant type having improved fugitivity from cotton fibers.

Additional objects of this invention will be apparent to those skilled in the art of fugitive tints.

The water-soluble polymeric surfactant fugitive tints with which this invention is concerned are fugitive tints such as are described in U.S. Patent No. 3,157,633 characterized by the general formula $R[(CH_2CH_2O)_nH]_x$ wherein R is a dyestuff radical, n is at least 15, x is from 1 to 6, and the product of n times x is at least 30, preferably between 50 and 200, more preferably between about 75 and 150.

Preferred amongst the compounds of the above formula are those wherein R is attached by an amino nitrogen. Compounds contemplated within this general class are those wherein R is a nitroso, nitro, azo, including monoazo, diazo and triazo, diphenylmethane, triarylmethane, xanthene, acridene, methine, thiazole, indamine, azine, oxazine, or anthraquinone dyestuff radical. Especially preferred are compounds represented by the general formula:

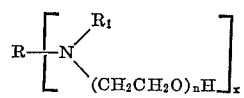

wherein R is an organic dyestuff radical, $R_1$ is a member selected from the group consisting of hydrogen, lower alkyl, aryl and aralkyl containing from 6 to 12 carbon atoms, and $\text{—}(CH_2CH_2O)_nH$, n is at least 15, x is from 1 to 6, and the product of n times x is at least 30. Included within this latter class are those wherein R is an azo or anthraquinone dyestuff radical.

It has now been discovered that the water-soluble polymeric surfactant fugitive tints previously described may be improved insofar as the tints' crock resistance and fugitivity is concerned by associating the tint with a water soluble polymer acid or with a salt of a water soluble polymer acid. Presumably hydrogen bonding occurs between the ether groups of the fugitive tints and the carboxyl groups of the polymer acid to form a molecular association, the molecular association thereby reducing the affinity of the ether groups for water. The water solubility of the associated polymeric structure may be maintained by keeping the associated polymeric structure in a substantially neutral to basic pH that is to say a pH of not less than 6.

The term water soluble polymeric acid as employed herein is meant to include water soluble polymeric acid salts and partial salts of copolymers of the water soluble polymeric acids. Water soluble polymeric acids which have been found to be especially suitable for purposes of this invention are the polymers of the water soluble carboxylic acids and more specifically the polymers of the water soluble olefine acids having the general formula $C_nH_{2n-2}O_2$ and water soluble alkylene dicarboxylic acids. Examples of specific olefin acids are acrylic, butenic, methylacrylic, crotonic, isocrotonic and vinylacetic and the like. Examples of specific alkylene dicarboxylic acids are maleic, fumeric and itaconic acid and the like. Such acids have not more than five carbon atoms. Copolymers which have been found to be especially suitable for purposes of this invention are the copolymers of alkylene dicarboxylic acids and most preferably the partial salts of the copolymers of alkylene dicarboxylic acids such as, for instance the partial sodium salt of styrene-maleic anhydride copolymer.

Improved results in the crocking characteristics of the fugitive tint are obtained by the addition of any amounts of water soluble polymer acid. The water soluble polymer acid should not, of course, be added in quantities which are so great as to substantially reduce the tinctorial properties of the tint. In general, best results are obtained when from about 10% by weight to about 60% by weight of water soluble polymer acid is associated with the fugitive tint, the preferred range being from 30% by weight to 50% by weight of water soluble polymer acid associated with the fugitive tint.

As previously mentioned, the pH of the polymer acid modified fugitive tint should preferably be no less than about 6. The preferred pH may be achieved by either buffering the aqueous medium or by employing a salt of the water soluble polymer acid. The partial sodium salt of styrene-maleic anhydride copolymer has been found to be very satisfactory for satisfying the pH requirements of this invention. It should be understood that salts other than sodium salts may be employed.

While improved results are obtained by treating any member selected from the class of anionic surfactant tints having the general formula as previously set forth, it is preferred to treat anionic surfactant tints having, in addition to the polyethyleneoxy group, a member selected from the group consisting of anthraquinone and an azo radical and preferably an azo radical having, in addition a sulfonic acid radical. One of the preferred classes of anionic surfactant tints may be represented by the following general formula:

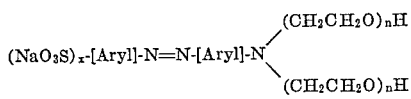

wherein Aryl in each instance is a carbocyclic aromatic nucleus containing from 6 to 10 carbon atoms in the ring, X is from 1 to 4, and $n$ and $n'$ are from 25 to 75. As is apparent from the above formula, although the preferred azo fugitive tints of this invention can have one or two ω-hydroxyethyl-polyethyleneoxy groups attached to the amino nitrogen, the most preferred and most readily prepared are those having two such groups.

A second class of preferred polyethyleneoxy fugitive tints are the anthraquinones, e.g., those which can be represented by the formula

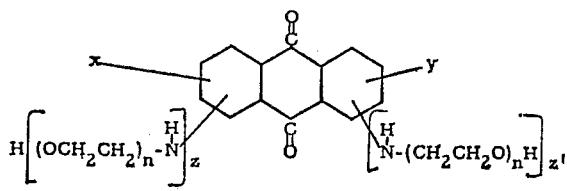

wherein $x$ and $y$ are nuclear substituents selected from the group consisting of hydrogen, amino, hydroxy, halo, nitro, —COO-alkali-metal and —SO$_3$-alkali-metal, and $n$ is at least 30, preferably between 30 and 200, and $z$ and $z'$ are a total of from one to four, e.gg., $z$ is one and $z$ and $z'$ are each 1, $z$ is one and $z'$ is two, and $z$ and $z'$ are both two, and the corresponding N,N-dihydroxyethyl-polyethyleneoxy compounds. As with the azo compounds, preferred amongst this class are those wherein at least one and preferably two of $x$ and $y$ are a sulfonic acid radical.

It has been found that fugitivity on wool of the above-described class of fugitive tints improves as the number of ethyleneoxy groups in the molecule increases and the best fugitive tints for materials containing wool fibers are those wherein at least 50 ethyleneoxy groups, and preferably at least 75 to 100 ethyleneoxy groups, are in the molecule. As the number of ethyleneoxy groups increases, the tinctorial power of the resulting fugitive tint is necessarily reduced. Thus, it is ordinarily preferred that the number of ethyleneoxy groups be less than about 200, and more preferably less than about 150. On the other hand, the compounds of this invention tend to be most highly fugitive towards cotton fibers when the number of ethyleneoxy groups in the molecule is relatively low, e.g., from 30 to 75. Also as the size and complexity of the dyestuff radical increases, the number of ethyleneoxy groups which must be present to pass the fugitivity test tends to increase. This tendency is offset by the presence of sulfonyloxy groups in the dyestuff radical, as stated above. Surprisingly, the introduction of such sulfonyloxy groups in the molecule does not reduce the fugitivity towards wool fibers, although it is well-known in the art that many of the best dyestuffs for wool have one or more sulfonyloxy groups in the molecule.

It has been found that in some cases dyestuffs having a primary or secondary aromatic amino nitrogen do not readily react with ethylene oxide to produce the fugitive tint compounds. Moreover, this is generally a less desirable way to prepare the compounds of this invention, as any unreacted starting material in the resultant product will necessarily result in a reduction of fugitivity thereof. Thus, the compounds of this invention are preferably prepared by converting an intermediate in the production of dyestuffs containing a free amino group to the corresponding polyethyleneoxy compound and employing the resulting compound to produce a compound having a chromophoric group in the molecule. In the case of azo dyestuffs, this can be accomplished by reacting a primary or secondary aromatic amine, preferably the former, with ethyleneoxide according to procedures well-known in the art, and then coupling the resulting compound with a diazonium salt of an aromatic amine.

With some of the other classes of dyestuffs, e.g., the anthraquinones, having chlorine, bromine or iodine attached to the aromatic nucleus, the dyestuff can be reacted with excess polyethylene glycol monoamine of the formula H(OCH$_2$CH$_2$)$_n$—NH$_2$ wherein $n$ is at least 30, according to the procedures known in the art to produce the corresponding secondary amine.

The polyethyleneoxy group can be introduced in other ways to produce fugitive tints. For example, anthraquinone-2-carboxylic acid can be reacted with a molar excess of a polyethylene glycol having a molecular weight above about 1350, e.g., in the presence of p-toluene-sulfonic acid in a suitable solvent, e.g., dioxane or nitro-benzene, to produce the corresponding polyethylene glycol monoester of anthraquinone-2-carboxylic acid. The reaction can also be conducted on other anthraquinone carboxylic acids containing one or more additional chromophoric or other non-interfering groups in the molecule. An aromatic amine, e.g., aniline or nuclear substituted aniline, can be reacted with a polyethylene glycol as described above under pressure at a temperature of about 220° C. to 230° C., preferably in the presence of iodine or a copper or sodium halide as a catalyst. The resulting amine, e.g., the polyethylene glycol substituted aniline, can then be coupled with the usual diazonium salts, e.g., H Acid, to produce a diazo fugitive tint of this invention.

An aromatic bromo compound, e.g., 2-bromo-anthraquinone, can be reacted with polyethylene glycol in the presence of sodium at 150° C. to produce the corresponding anthraquinone polyethylene glycol ether. A nitrophenol, e.g., p-nitrophenol, can be reacted with polyethylene glycol in the same manner to produce the p-nitrophenol polyethylene glycol ether. This compound can then be reduced by any of the methods well-known in the art for reducing aromatic nitro groups, e.g., zinc and acetic acid, hydrogen and catalyst, to produce the corresponding p-amino compounds which can then be diazotized and coupled with a suitable aromatic compound, e.g., H acid, to produce a fugitive tint of this invention.

In general, the anionic surfactant tints may be associated with the water soluble polymer acid by the addition of appropriate amounts of water soluble polymer acid to aqueous solutions of the surfactant tint.

EXAMPLE I 102.2 g. (0.523 mol) of N,N-dihydroxyethyl-m-toluidine was placed in a flask equipped with a stirrer, thermometer and gas inlet and outlet tubes. The air therein was replaced by nitrogen and the material was heated to about 140° C. About 200 mg. of sodium was added as a catalyst. Ethylene oxide was then bubbled into the vigorously stirred, molten material at a rate such that a slight amount of gas escaped from the outlet tube and until the reaction mixture had increased in weight to about 500 g. Another 200 mg. of sodium was added and ethylene oxide was added at a temperature of about 160° C. until the reaction mixture weighed about 1840 g. About 76 molar equivalents of ethylene oxide had thus been added to the starting material to produce the compound

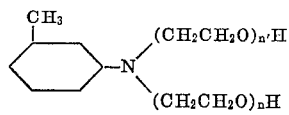

wherein $n$ and $n'$ each are about 40. This compound melts at about 50° C. Dissolve 1127 g. of this compound in an equal amount of water and add at 0° C. to a solution of 42.3 g. of a diazonium salt of aniline. Maintain the reaction mixture at that temperature for 15 minutes and then allow it to rise at room temperature. Add sodium acetate during the reaction to maintain the pH at about 2 to 4. After all the diazonium salt has reacted (about 2 hours) make the solution slightly alkaline with sodium bicarbonate. A solution of a yellow fugitive tint is obtained. 400 g. of the partial sodium salt of styrene-maleic anhydride copolymer is then added. The partial sodium salt of styrene-maleic anhydride copolymer associates with the anionic surfactant tint presumably by means of hydrogen bonding to produce a crock resistant fugitive tint. Textile rovings including cotton rovings are treated with 2% aqueous solutions of this crock resistant fugitive tint and are found to be free of objectionable mark-off on passage through drafting rolls. The treated cotton is found to exhibit good fugitivity.

EXAMPLE II 102.2 g. (0.523 mol) of N,N-dihydroxyethyl-m-toluidine was placed in a flask equipped with a stirrer, thermometer and gas inlet and outlet tubes. The air therein was replaced by nitrogen and the material was heated to about 140° C. About 200 mg. of sodium was added as a catalyst. Ethylene oxide was then bubbled into the vigorously stirred, molten material at a rate such that a slight amount of gas escaped from the outlet tube and until the reaction mixture had increased in weight to about 550 g. Another 200 mg. of sodium was added and ethylene oxide was added at a temperature of about 160° C. until the reaction mixture weighed about 1840 g. About 76 molar equivalents of ethylene oxide had thus been added to the starting material to produce the compound

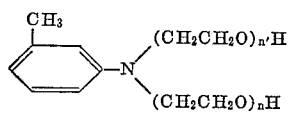

wherein $n$ and $n'$ each are about 40. This compound melts at about 50° C. Dissolve 1127 g. of this compound in an equal amount of water and add at 0° C. to a solution of a diazonium salt of naphthylamine-3,6,8-trisulfonic acid. Maintain the reaction mixture at a temperature of 0° C. for 15 minutes and then allow it to rise to room temperature. Add sodium acetate during the reaction to maintain the pH at about 2 to 4. After all the diazonium salt has reacted, make the solution slightly alkaline with sodium bicarbonate. A solution of salmon colored anionic surfactant tint is obtained. The partial sodium salt of styrene-maleic anhydride copolymer is then added. The partial sodium salt of styrene-maleic anhydride copolymer associates with the salmon colored anionic surfactant presumably by means of hydrogen bonding to produce a non-crocking fugitive tint. Textile rovings including cotton rovings are treated with 2% aqueous solutions of this crock resistant fugitive tint and are found to be free of objectionable mark-off on passage through drafting rolls. The treated cotton is found to exhibit good fugitivity.

EXAMPLE III

The procedure of Example II is repeated with the exception that 600 g. of acrylic acid is added to the solution of salmon colored anionic surfactant tint. The acrylic acid associates with the tint by means of hydrogen bonding, the pH of the resultant molecular association being maintained at 7 to insure water solubility. Textile rovings including cotton rovings are treated with 2% aqueous solutions of this crock resistant fugitive tint and are found to be free of objectionable mark-off on passage through draft rolls. The treated cotton is found to exhibit good fugitivity.

Having thus disclosed the invention, what is claimed is:

1. As a water-soluble fugitive tint, the molecular complex resultant from associating in an aqueous solution an anionic polymer characterized by the formula

wherein R is an azo radical, $n$ is at least 15, $x$ is from 1 to 6 and the product of $n$ times $x$ is at least 30, with a water soluble organic polymeric acid compound capable of forming a molecular association with the ether groups of said anionic polymer, said tint having a pH of not less than 6 and said polymeric acid compound comprising from about 10% by weight to about 60% by weight of said tint on a dry basis and containing carboxylic acid groups having not more than five carbon atoms.

2. As a water-soluble fugitive tint, the molecular complex resultant from associating in an aqueous solution a water-soluble polymeric acid with an anionic polymer characterized by the formula

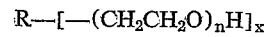

wherein R is an azo radical, $n$ is at least 15, $x$ is from 1 to 6, and the product of $n$ times $x$ is at least 30, said tint having a pH of not less than 6 and said polymeric acid compound comprising from about 10% by weight to about 60% by weight of said tint on a dry basis and containing carboxylic acid groups having not more than five carbon atoms.

3. The water-soluble fugitive tint of claim 2 wherein said water-soluble polymeric acid is an acid selected from the group consisting of olefin acids and alkylene dicarboxylic acids.

4. As a water-soluble fugitive tint, the molecular complex resultant from associating in an aqueous solution a water-soluble polymeric acid with an anionic polymer characterized by the formula

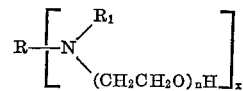

wherein R is an azo radical, $R_1$ is a member selected from the group consisting of hydrogen, lower alkyl, aryl and aralkyl containing from 6 to 12 carbon atoms, and $-(CH_2CH_2O)_nH$; $n$ is at least 15, $x$ is from 1 to 6, and the product of $n$ times $x$ is at least 30; said tint having a pH of not less than 6 and said polymeric acid compound comprising from about 10% by weight to about 60% by weight of said tint on a dry basis and comprising carboxylic acid groups having not more than five carbon atoms.

5. The water-soluble fugitive tint of claim 4 wherein said water-soluble polymeric acid is an acid selected from the group consisting of olefin acids and alkylene dicarboxylic acids.

6. As a water-soluble fugitive tint, the molecular complex resultant from associating in an aqueous solution the partial sodium salt of styrene-maleic anhydride copolymer with an anionic polymer characterized by the formula

wherein R is an organic azo dyestuff radical, $n$ is at least 15, $x$ is from 1 to 6 and the product of $n$ times $x$ is at least 30, said tint having a pH of not less than 6 and said sodium salt of said copolymer comprising from about 10% by weight to about 60% by weight of said tint on a dry basis.

7. As a water-soluble fugitive tint, the molecular complex resultant from associating in an aqueous solution the partial sodium salt of styrene-maleic anhydride copolymer with an anionic polymer characterized by the formula

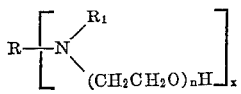

wherein R is an organic azo dyestuff radical, $R_1$ is a member selected from the group consisting of hydrogen, lower alkyl, aryl and aralkyl containing from 6 to 12 carbon atoms, and —$(CH_2CH_2O)_nH$; $n$ is at least 15, $x$ is from 1 to 6, and the product of $n$ times $x$ is at least 30; said tint having a pH of not less than 6 and said sodium salt of said copolymer comprising from about 10% by weight to about 60% by weight of said tint on a dry basis.

8. As a water-soluble fugitive tint, the molecular complex resultant from associating in an aqueous solution a substantially anionic polymer characterized by the formula

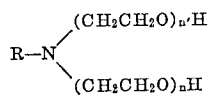

wherein R—N is an organic azo dyestuff radical and $n$ and $n'$ are each from 25 to 75, with the partial sodium salt of styrene-maleic anhydride copolymer, said tint having a pH of not less than 6 and said sodium salt of said copolymer comprising from about 10% by weight to about 60% by weight of said tint on a dry basis.

9. As a water-soluble fugitive tint, the molecular complex resultant from associating in an aqueous solution a substantially anionic polymer characterized by the formula

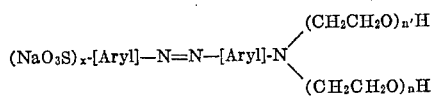

wherein Aryl in each instance is a carbocyclic nucleus containing from 6 to 10 carbon atoms in the ring, $x$ is from 1 to 4, and $n$ and $n'$ are each from 25 to 75 with the partial sodium salt of styrene-maleic anhydride copolymer, said tint having a pH of not less than 6 and said sodium salt of said copolymer comprising from about 10% by weight to about 60% by weight of said tint on a dry basis.

10. As a water-soluble fugitive tint, the molecular complex resultant from associating in an aqueous solution the reaction product of a diazonium salt and a substantially anionic polymer characterized by the formula

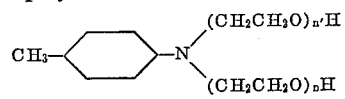

$n$ and $n'$ are each from 25 to 75 with the partial sodium salt of styrene-maleic anhydride cooplymer, said tint having a pH of not less than 6 and said sodium salt of said copolymer comprising from about 10% by weight to about 60% by weight of said tint on a dry basis.

References Cited

UNITED STATES PATENTS

| | | | |
|---|---|---|---|
| 2,632,004 | 3/1953 | Minsk et al. | 260—379 XR |
| 2,732,382 | 1/1956 | Minsk et al. | 260—379 |
| 3,157,633 | 11/1964 | Kuhn | 260—196 XR |
| 3,190,861 | 6/1965 | Fertig et al. | 260—196 XR |

FLOYD D. HIGEL, *Primary Examiner.*

U.S. Cl. X.R.

8—41, 50; 106—19; 117—289; 260—194, 196, 376, 379, 383

PO-1050
(5/69)

UNITED STATES PATENT OFFICE
CERTIFICATE OF CORRECTION

Patent No. 3,449,319       Dated June 10, 1969

Inventor(s) Hans H. Kuhn

It is certified that error appears in the above-identified patent and that said Letters Patent are hereby corrected as shown below:

Column 1, line 12, delete "as" and insert --an--. Column 3, line 50, delete "e.gg." and insert --e.g.--. Line 50, after "one" in its second occurrence insert --and z' is 0,--. Column 5, Example II, the formula should appear as follows:

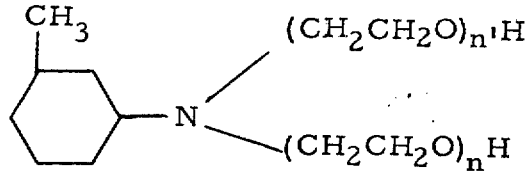

Column 6, line 11, delete "draft" and insert --drafting--. Claim 4, line 8 after the formula, delete "comprising" and insert --containing--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents